(12) United States Patent
Romoser

(10) Patent No.: US 8,763,359 B2
(45) Date of Patent: Jul. 1, 2014

(54) APPARATUS FOR COMBUSTING FUEL WITHIN A GAS TURBINE ENGINE

(75) Inventor: Carey Edward Romoser, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 615 days.

(21) Appl. No.: 13/169,926

(22) Filed: Jun. 27, 2011

(65) Prior Publication Data

US 2011/0259013 A1   Oct. 27, 2011

Related U.S. Application Data

(62) Division of application No. 11/839,226, filed on Aug. 15, 2007, now Pat. No. 7,966,820.

(51) Int. Cl.
| | | |
|---|---|---|
| *F02C 3/00* | (2006.01) | |
| *F23R 3/34* | (2006.01) | |
| *F02C 7/264* | (2006.01) | |
| *F23R 3/36* | (2006.01) | |
| *F23R 3/28* | (2006.01) | |
| *F23N 1/02* | (2006.01) | |
| *F02C 9/26* | (2006.01) | |
| *F02C 9/34* | (2006.01) | |

(52) U.S. Cl.
CPC ............... *F23N 1/022* (2013.01); *F23R 3/343* (2013.01); *F02C 7/264* (2013.01); *F23N 2037/10* (2013.01); *F23R 3/36* (2013.01); *F23R 3/286* (2013.01); *F23N 2027/02* (2013.01); *F23D 2900/00008* (2013.01); *F23N 2037/02* (2013.01); *F23N 2037/08* (2013.01); *F23N 2041/20* (2013.01); *F02C 9/263* (2013.01); *F02C 9/34* (2013.01)
USPC .............................. 60/39.463; 60/746; 60/748

(58) Field of Classification Search
CPC ........... F02C 9/263; F23D 2900/00008; F23N 2027/02; F23N 2037/02; F23N 2037/08; F23N 2037/10; F23N 2041/20; F23R 3/286; F23R 3/343; F23R 3/36
USPC .............. 60/39.463, 734, 737, 738, 742, 746, 60/747, 748
See application file for complete search history.

(56) References Cited

U.S. PATENT DOCUMENTS

| | | | |
|---|---|---|---|
| 4,420,929 A | 12/1983 | Jorgensen et al. | |
| 5,193,346 A | 3/1993 | Kuwata et al. | |
| 5,199,265 A | 4/1993 | Borkowicz | |
| 5,259,184 A | 11/1993 | Borkowicz et al. | |
| 5,408,830 A | 4/1995 | Lovett | |
| 5,435,126 A | 7/1995 | Beaudoin | |
| 5,491,970 A | 2/1996 | Davis, Jr. et al. | |
| 5,685,139 A | 11/1997 | Mick et al. | |
| 6,397,602 B2 | 6/2002 | Vandevort et al. | |
| 6,598,383 B1 | 7/2003 | Vandevort et al. | |
| 7,546,735 B2 * | 6/2009 | Widener ..................... | 60/746 |
| 8,061,118 B2 * | 11/2011 | Kothnur et al. ............ | 60/39.281 |
| 2004/0118119 A1 | 6/2004 | Martling et al. | |
| 2004/0118120 A1 | 6/2004 | Martling | |
| 2004/0123597 A1 | 7/2004 | Kraft et al. | |
| 2004/0177615 A1 | 9/2004 | Martling | |
| 2005/0268617 A1 | 12/2005 | Amond, III et al. | |
| 2009/0165436 A1 * | 7/2009 | Herbon et al. ............. | 60/39.826 |

FOREIGN PATENT DOCUMENTS

| | | |
|---|---|---|
| CN | 1078789 A | 11/1993 |
| CN | 1971013 A | 5/2007 |
| JP | 6018037 A | 1/1994 |
| JP | H07324749 A | 12/1995 |
| JP | H0854120 A | 2/1996 |
| JP | 2528894 B2 | 8/1996 |
| JP | 10019258 A | 1/1998 |
| JP | 2001227745 A | 8/2001 |
| JP | 2002061517 A | 2/2002 |
| JP | 2002138856 A | 5/2002 |

OTHER PUBLICATIONS

Office of Air Quality Planning and Standards; Office of Air and Radiation; US EPA "Compilation of Air Pollutant Emission Factors," vol. I: Stationary Point and Area Sources; AP-42 Fifth Edition, Jan. 1995; pp. 3.1-6.

John R. Richards, "Control of Nitrogen Oxides Emissions", Student Manual Air Pollution Training Institute; Course 418, ICES Ltd., Sep. 2000; pp. 10-14 and 10-15.

Brian W. Doyle, Combustion Source Evaluation:, Student Manual Air Pollution Training Institute; Course 427, Third Edition, ICES Ltd., Jun. 2003; pp. 6-33 to 6-37.

Notice of Final Rejection from JP Application No. 2008-206498 dated Jun. 4, 2013.

Office Action from JP Application No. 2012-161055 dated Jun. 4, 2013.

JP Office Action dated Nov. 6, 2012 from corresponding Application No. 2008-206498 along with unofficial English translation.

Office Action from CN Application No. 201210220544X dated Jan. 28, 2014 along with unofficial English Translation.

* cited by examiner

*Primary Examiner* — Phutthiwat Wongwian
(74) *Attorney, Agent, or Firm* — Armstrong Teasdale LLP

(57) ABSTRACT

A system for a gas turbine engine includes a combustor assembly coupled to a plurality of first nozzles having outlet passageways coupled to a first fuel source and first passageways coupled to a second fuel source. The system also includes the combustor assembly coupled to a second nozzle that has second passageways coupled to the second fuel source. An associated control system, coupled to the combustor assembly, is configured to channel a first fuel from the first fuel source through the outlet passageways, and channel a second fuel from the second fuel source through the second passageways when the engine attains a predetermined load. The control system is further configured to channel the second fuel from the second fuel source through the first passageways and to reduce a flow of the first fuel entering the first nozzles when the engine is at a load greater than a first predetermined load.

11 Claims, 7 Drawing Sheets

APPARATUS FOR COMBUSTING FUEL WITHIN A GAS TURBINE ENGINE

CROSS-REFERENCE TO RELATED APPLICATIONS

This application is a divisional of U.S. patent application Ser. No. 11/839,226, filed Aug. 15, 2007 now U.S. Pat. No. 7,966,820, which is hereby incorporated by reference and is assigned to the assignee of the present invention.

BACKGROUND OF THE INVENTION

This invention relates generally to a gas turbine engine, and, more specifically, to a combustion system for a gas turbine engine.

In at least some known gas turbine engine combustion systems, to facilitate reducing the possibility of lean blowout, or a blow out caused when the environment has a low fuel to air ratio, diffusion fuel is used to start turbine operation. Depending on the turbine, diffusion fuel injected through fuel nozzles may become concentrated downstream from the fuel injection nozzles. The increased concentration of diffusion fuel may undesirably increase a fuel rich fuel/air ratio downstream from the fuel injection nozzles such that the fuel/air ratio is increases beyond the upper design limit. Such a fuel rich environment may exceed a rich blow out (RBO) boundary causing the diffusion fuel flame to blow out. More specifically, most known rich blow outs occur at about 80% of turbine speed during turbine start up.

Some known combustion systems compensate for the fuel rich environment by reducing the flow of diffusion fuel and injecting a fuel premixed with air before the turbine obtains full operating speed. A turbine start-up that injects premixed fuel before the turbine reaches full speed may be referred to, for example, as a "lean-lean start." However, because the premix fuel flame is more unstable than diffusion fuel flames, to facilitate stabilizing the flame more fuel must be supplied to a premix fuel flame than to a diffusion fuel flame. For example, in some known systems, approximately 50% or more of the total fuel injected into the combustor is premix fuel injected through one of the plurality of nozzles within the combustor.

In at least some known combustors, a lean-lean start may increase the local liner wall temperature near the premix fuel flame. Such an increase in temperature generally occurs because of the disproportionate amount of premixed fuel supplied to one of the fuel nozzles, as compared to the amount of fuel supplied to other nozzles within the combustor. Moreover, such an increase in temperature may prematurely wear the combustor hardware surrounding the flame, such as, for example, the combustor liner and/or transition pieces. As a result, such combustor hardware may be replaced more frequently than if the start-up combustion temperatures were maintained at a lower temperature. To compensate for higher temperatures, some known combustors include components that are more resistant to thermal wear. Such components may add cost and/or weight to the engine compared to engines having combustors that do not include thermally resistant components.

BRIEF DESCRIPTION OF THE INVENTION

In one aspect, a method for operating a gas turbine engine including a combustor assembly is provided. The method includes channeling a first fluid through a first nozzle into the combustor assembly, igniting the first fluid within the combustor assembly downstream from the first nozzle, channeling a second fluid through a second nozzle into the combustion assembly when the gas turbine engine attains a speed of greater than 85% of rated speed, igniting the second fluid within the combustor assembly downstream from the second nozzle, terminating a flow of the first fluid through the first nozzle, and channeling the second fluid to the first nozzle.

In another aspect, a nozzle for channeling a fluid into a combustor assembly is provided. The nozzle includes a body including a centerline, a first passageway extending through the body along the centerline, and a nozzle tip coupled to a downstream end of the first passageway. The nozzle tip has a radius extending from a center of the nozzle tip to an outer surface of the nozzle tip. The nozzle tip includes a downstream face, and a plurality of outlet passageways that each include an opening defined in the downstream face. Each opening includes respective X-, Y-, and Z-axes defined with respect to a tangent line, the radius, and the centerline. Each of the plurality of outlet passageways is at discharge angle of greater than 30° measured with respect to the respective Z-axis in a respective X-Z plane.

In still another aspect, a combustor assembly for use with a gas turbine engine is provided. The system includes a plurality of first nozzles coupled to the combustor assembly. Each of the first nozzles includes a nozzle tip having a plurality of outlet passageways coupled to a first fuel source. Each of the first nozzles further includes a plurality of first vane passageways coupled to a second fuel source. The system further includes a second nozzle coupled to the combustor assembly. The second nozzle includes a plurality of second vane passageways coupled to the second fuel source. The system includes a control system coupled to the combustor assembly. The control system is configured to channel a first fuel from the first fuel source through the outlet passageways of the first nozzles, and to channel a second fuel from the second fuel source through the second vane passageways of the second nozzle when the gas turbine engine attains a speed of greater than 85% of rated speed. The control system is further configured to channel the second fuel from the second fuel source through the plurality of first vane passageways of the plurality of first nozzles when the gas turbine engine is at a load of greater than a first predetermined percentage of a baseload, and to reduce a flow of the first fuel entering the plurality of first nozzles when the gas turbine engine is at a load of greater than the first predetermined percentage of the baseload.

DETAILED DESCRIPTION OF THE INVENTION

Figure 1:
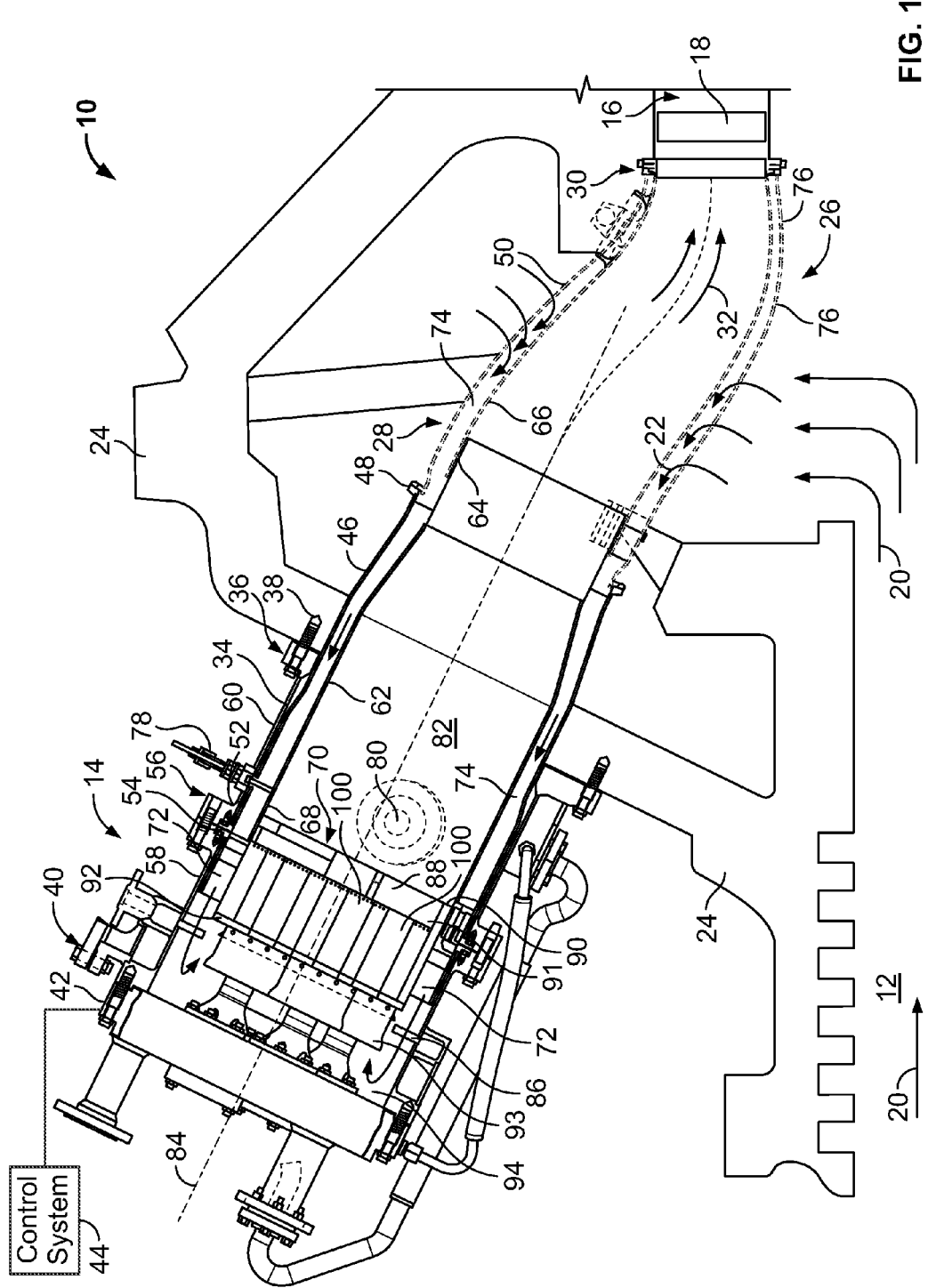
FIG. 1 is partial cross-sectional view of an exemplary gas turbine combustion system.
Figure 2:
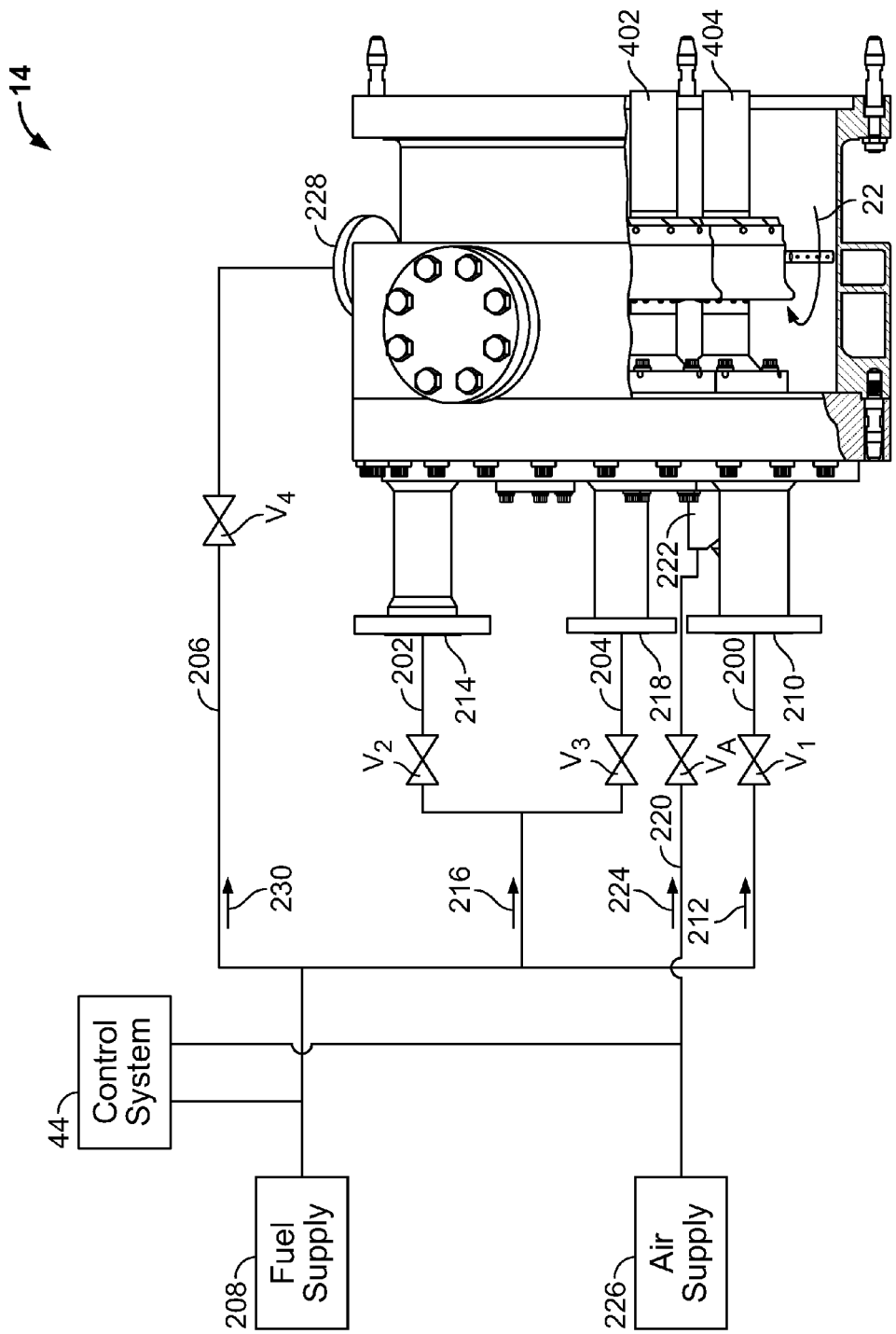
FIG. 2 is a schematic side view of a portion of the combustion system shown in FIG. 1.
Figure 3:
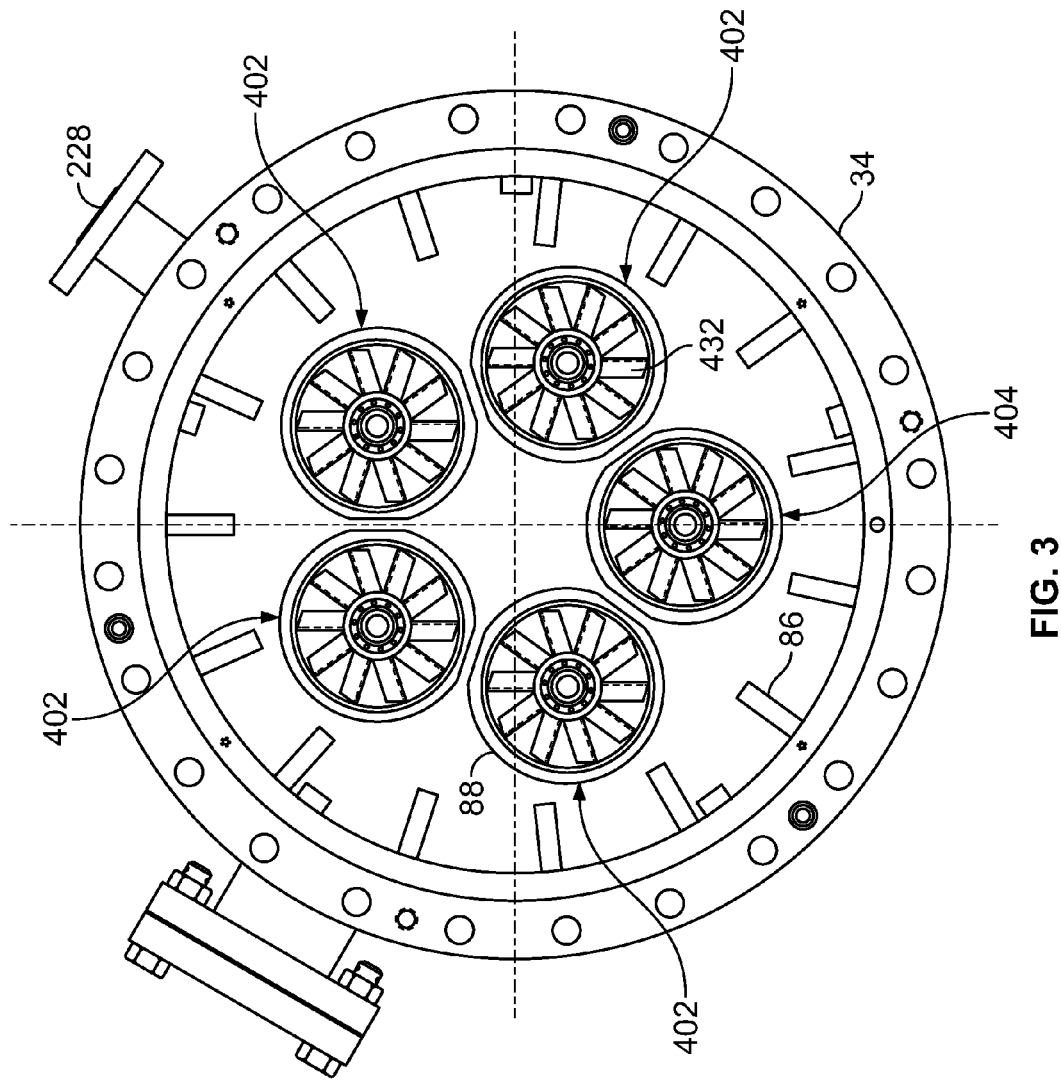
FIG. 3 is front view of the combustion system shown in FIG. 2.

FIG. 1 is partial cross-sectional view of an exemplary gas turbine engine 10 that includes a plurality of fuel nozzle assemblies 400. FIG. 2 is a schematic side view of a portion of gas turbine engine 10. FIG. 3 is front view of the portion of gas turbine engine 10 shown in FIG. 2.

Gas turbine engine 10 includes a compressor 12, a combustor 14, and a turbine 16. Only a first stage nozzle 18 of turbine 16 is shown in FIG. 1. In the exemplary embodiment, turbine 16 is drivingly coupled to compressor 12 with rotors (not shown) that are connected by a single common shaft (not shown). Compressor 12 pressurizes inlet air 20 which is then channeled to combustor 14 where it cools combustor 14 and provides air to the combustion process. More specifically, air 22 channeled to combustor flows in a direction generally opposite to the flow of air through engine 10. In the exemplary embodiment, gas turbine engine 10 includes a plurality of combustors 14 oriented circumferentially about engine casing 24. More specifically, in the exemplary embodiment, combustors 14 are, for example, but are not limited to being, can-annular combustors.

In the exemplary embodiment, engine 10 includes a double-walled transition duct 26. More specifically, in the exemplary embodiment, transition duct 26 extends between an outlet end 28 of each combustor 14 and the inlet end 30 of turbine 16 to channel combustion gases 32 into turbine 16. Further, in the exemplary embodiment, each combustor 14 includes a substantially cylindrical combustor casing 34. Combustor casing 34 is coupled at an open aft end 36 to engine casing 24. Combustor casing 34 may be coupled to engine casing 24 using, for example, but not limited to using, bolts 38, mechanical fasteners (not shown), welding, and/or any other suitable coupling means that enables engine 10 to function as described herein. In the exemplary embodiment, a forward end 40 of combustor casing 34 is coupled to an end cover assembly 42. End cover assembly 42 includes, for example, supply tubes, manifolds, valves for channeling gaseous fuel, liquid fuel, air and/or water to the combustor, and/or any other components that enable engine 10 to function as described herein. In the exemplary embodiment, the components within end cover assembly 42 are coupled to a control system 44 for controlling at least the air and fuel entering combustor 14, as described in more detail below. Control system 44 may be, for example, but is not limited to being, a computer system and/or any other system that enables combustor 14 to function as described herein.

In the exemplary embodiment, a substantially cylindrical flow sleeve 46 is coupled within combustor casing 34 such that sleeve 46 is substantially concentrically aligned with casing 34. Flow sleeve 46 is coupled at an aft end 48 to an outer wall 50 of transition duct 26 and coupled at a forward end 52 to combustor casing 34. More specifically, in the exemplary embodiment, forward end 52 is coupled to combustor casing 34 by, for example, coupling a radial flange 54 of sleeve 46 to combustor casing 34 at a butt joint 56 such that a forward section 58 and an aft section 60 of casing 34 are coupled against each other. Alternatively, sleeve 46 may be coupled to casing 34 and/or transition duct 26 using any other suitable coupling assembly that enables engine 10 to function as described herein.

Flow sleeve 46, in the exemplary embodiment, includes a combustion liner 62 coupled therein. Combustion liner 62 is aligned substantially concentrically within flow sleeve 46 such that an aft end 64 is coupled to an inner wall 66 of transition duct 26, and such that a forward end 68 is coupled to a combustion liner cap assembly 70. Combustion liner cap assembly 70 is secured within combustor casing 34 by a plurality of struts 72 and an associated mounting assembly (not shown). In the exemplary embodiment, an air passage 74 is defined between liner 62 and flow sleeve 46, and between transition duct inner and outer walls 66 and 50. Transition duct outer wall 50 includes a plurality of apertures 76 defined therein that enable compressed air 20 from compressor 12 to enter air passage 74. In the exemplary embodiment, air 22 flows in a direction opposite to a direction of core flow (not shown) from compressor 12 towards end cover assembly 42. Further, in the exemplary embodiment, combustor 14 also includes a plurality of spark plugs 78 and a plurality of cross-fire tubes 80. Spark plugs 78 and cross-fire tubes 80 extend through ports (not shown) in liner 62 that are defined downstream from combustion liner cap assembly 70 within a combustion zone 82. Spark plugs 78 and cross-fire tubes 80 ignite fuel and air within each combustor 14 to create combustion gases 32.

In the exemplary embodiment, a plurality of fuel nozzle assemblies 400 are coupled to end cover assembly 42. More specifically, in the exemplary embodiment, combustor 14 includes five nozzle assemblies 400. Alternatively, combustor 14 may include more or less than five fuel nozzle assemblies 400. In the exemplary embodiment, fuel nozzle assemblies 400 are arranged in a generally circular array about a centerline 84 of combustor 14. Alternatively, fuel nozzle assemblies 400 may be arranged in a non-circular array. Although, only one type of fuel nozzle assembly 400 is described herein, more than one type of nozzle assembly, or any other type of fuel nozzle, may be included in combustor 14. Further, in the exemplary embodiment, combustor 14 includes a plurality of quaternary pegs 86 that extend radially inward from combustor casing 34 and substantially circumscribe fuel nozzle assemblies 400. Although the exemplary embodiment includes quaternary pegs 86, other embodiments may not include quaternary pegs 86.

Combustion liner cap assembly 70 includes a plurality of premix tube assemblies 88. In the exemplary embodiment, each premix tube assembly 88 substantially circumscribes each fuel nozzle assembly 400, and as such, the number of premix tube assemblies 88 is equal to the number of nozzle assemblies 400. Alternatively, the number of premix tube assemblies 88 may be greater than, or less than, the number of nozzle assemblies 400. In the exemplary embodiment, each premix tube assembly 88 extends partially into combustion liner cap assembly 70 such that premix tube assemblies 88 are coupled to an aft support plate 90 and to a forward support plate 92. More specifically, an aft end 91 of each premix tube assembly 88 extends through openings (not shown) in aft plate 90 and a forward end 93 of premix tube assembly 88 extends through openings (not shown) in plate 92.

In the exemplary embodiment, forward support covers (not shown) are included and are each coupled to support plate 92. The support covers facilitate securing plate 92 of each of premix tube assemblies 88 to combustor 14. Further, aft plate 90 may be an impingement plate that includes an array of effusion cooling apertures (not shown), and that may be shielded from the thermal heat generated by of the combustor flame by shield plates (not shown). In the exemplary embodiment, each premix tube assembly 88 includes an assembly including two tubes (not shown) that are separated by a premix tube hula seal (not shown). The hula seal enables the dual-tube assembly to thermally expand and contract as combustion liner cap assembly 70 expands during operating conditions. Thus, as the distance between plates 92 and 90 changes due to thermal expansion, premix tube assemblies 88 are free to expand accordingly along an axis of symmetry (not shown).

Plate 92, in the exemplary embodiment, is coupled to a plurality of forwardly-extending floating collars (not shown). The collars are substantially concentrically aligned with each of the openings defined in plate 92 such that each premix tube assembly 88 includes one collar. Alternatively, each premix tube assembly 88 may include more or less than one collar. In the exemplary embodiment, each collar supports an air swirler (not shown), which may be, for example, positioned adjacent to a radially outermost wall (not shown) of each fuel nozzle assembly 400, formed integrally with each nozzle assembly 400, and/or configured in any other suitable configuration that enables engine 10 to function as described herein. The arrangement of swirlers is such that air 22 flowing through air passage 74 is forced to reverse direction at a combustor inlet end 94 of combustor 14 (between end cover assembly 42 and combustion liner cap assembly 70) and to flow through the air swirlers and premix tube assemblies 88. Fuel passages (not shown) in each of the air swirlers channel fuel through an arrangement of apertures that continuously introduce gaseous fuel, depending upon the operational mode of gas turbine engine 10, into the passing air 22 to create a fuel and air mixture that is ignited in combustion burning zone 82 and downstream from premix tube assemblies 88.

In the exemplary embodiment, combustor 14 includes four fuel circuits 200, 202, 204, and 206, that are coupled to a fuel supply 208 and to control system 44. Although only one fuel supply 208 is shown and described, engine 10 may include more than one fuel supply 208. Moreover, fuel supply 208 may include a plurality of types of fuel. Specifically, in the exemplary embodiment, combustor 14 includes a primary fuel circuit 200, a secondary fuel circuit 202, a tertiary fuel circuit 204, and a quaternary fuel circuit 206. Alternatively, combustor 14 may include more or less than four fuel circuits 200, 202, 204, and/or 206. In the exemplary embodiment, primary fuel circuit 200 includes a primary circuit inlet 210 to supply fuel, for example, diffusion fuel 212, to primary fuel circuit 200. Secondary fuel circuit 202 includes a secondary circuit inlet 214 to supply fuel, for example, premix fuel 216, to secondary fuel circuit 202. Similarly, tertiary fuel circuit 204 includes a tertiary circuit inlet 218 to supply fuel, for example, premix fuel 216, to tertiary fuel circuit 204. Quaternary fuel circuit 206 includes a quaternary circuit inlet 228 to supply fuel, for example, premix fuel 230, to quaternary fuel circuit 206.

In the exemplary embodiment, combustor 14 also includes a purge air circuit 220 having a purge air circuit inlet 222 used to supply air 224 to at least one fuel nozzle assembly 400 from an air supply 226, as described in more detail below. In the exemplary embodiment, air supply 226 includes air 22 channeled from air passage 74. Alternatively, air supply 226 may supply air from any other suitable supply of air, such as, for example, ambient air. Purge air circuit 220 is coupled to control system 44. In the exemplary embodiment, premix fuel 216 and premix fuel 230 have generally similar compositions. Alternatively, premix fuel 230 may have a composition that is different than the composition of premix fuel 216. Moreover, as used herein, the term "premix fuel" refers to fuel, which may be gaseous, liquid, or pulverized solid fuel, that is mixed with air prior to entering combustion zone 82. Further, as used herein, the term "diffusion fuel" refers to fuel, which may be gaseous, liquid, or pulverized solid fuel, that is not mixed with air prior to entering combustion zone 82.

In the exemplary embodiment, four of the five fuel nozzle assemblies 400 are primary fuel nozzle assemblies 402 and are coupled to primary fuel circuit 200 and to secondary fuel circuit 202, and the remaining fuel nozzle assembly 400 is a tertiary fuel nozzle assembly 404 that is coupled to tertiary fuel circuit 204 and purge air circuit 220. Each quaternary peg 86 is coupled to quaternary fuel circuit 206. Further, in the exemplary embodiment, each fuel circuit 200, 202, 204, and 206 includes a respective valve $V_1$, $V_2$, $V_3$, and $V_4$ used to control fuel flow into each circuit 200, 202, 204, and/or 206. Purge air circuit 220 includes a valve $V_A$ used to control the air flow into circuit 220. More specifically, in the exemplary embodiment, valve $V_1$ controls an amount of diffusion fuel 212 entering primary fuel circuit 200, valve $V_2$ controls a flow of premix fuel 216 into secondary fuel circuit 202, valve $V_3$ controls a flow of premix fuel 216 into tertiary fuel circuit 204, and valve $V_4$ controls an amount of premix fuel 230 entering quaternary fuel circuit 206. In an alternative embodiment, a premix valve (not shown) is coupled to both secondary and tertiary fuel circuits 202 and 204 to control a flow of premix fuel 216 into valves $V_2$ and $V_3$ from fuel supply 208. In the exemplary embodiment, fuel circuits 200, 202, 204, and 206 are coupled to control system 44 to control fuel flow to circuits 200, 202, 204, and 206, and to fuel nozzle assemblies 400. More specifically, control system 44 may control fuel flow by, for example, but not limited to, controlling valves $V_1$, $V_2$, $V_3$, and $V_4$. Similarly, purge air circuit valve $V_A$ is coupled to control system 44 such that a purge air flow may be regulated.

In operation, air 20 enters engine 10 through an inlet (not shown) and is compressed in compressor 12. Compressed air 20 is discharged from compressor 12 and is channeled to combustor 14. Air 20 enters combustor through apertures 76 and then flows through air passage 74 towards end cover assembly 42 of combustor 14. Air 22 flowing through air passage 74 is forced to reverse its flow direction at combustor inlet end 94 and is redirected through the air swirlers and premix tube assemblies 88. Fuel 212, 216, and/or 230 is supplied into combustor 14 through end cover assembly 42. Control system 44 regulates the air 22 and/or 224 and fuel 212, 216, and/or 230 supplied to nozzle assemblies 400 and/or premix tube assemblies 88, as described in more detail below. Ignition is initially achieved when control system 44 initiates a starting sequence of gas turbine engine 10, and spark plugs 78 are retracted from combustion burning zone 82 once a flame has been continuously established. At the opposite end of combustion burning zone 82, hot combustion gases 32 are channeled through transition duct 26 and turbine nozzle 18 towards turbine 16.

Figure 4:
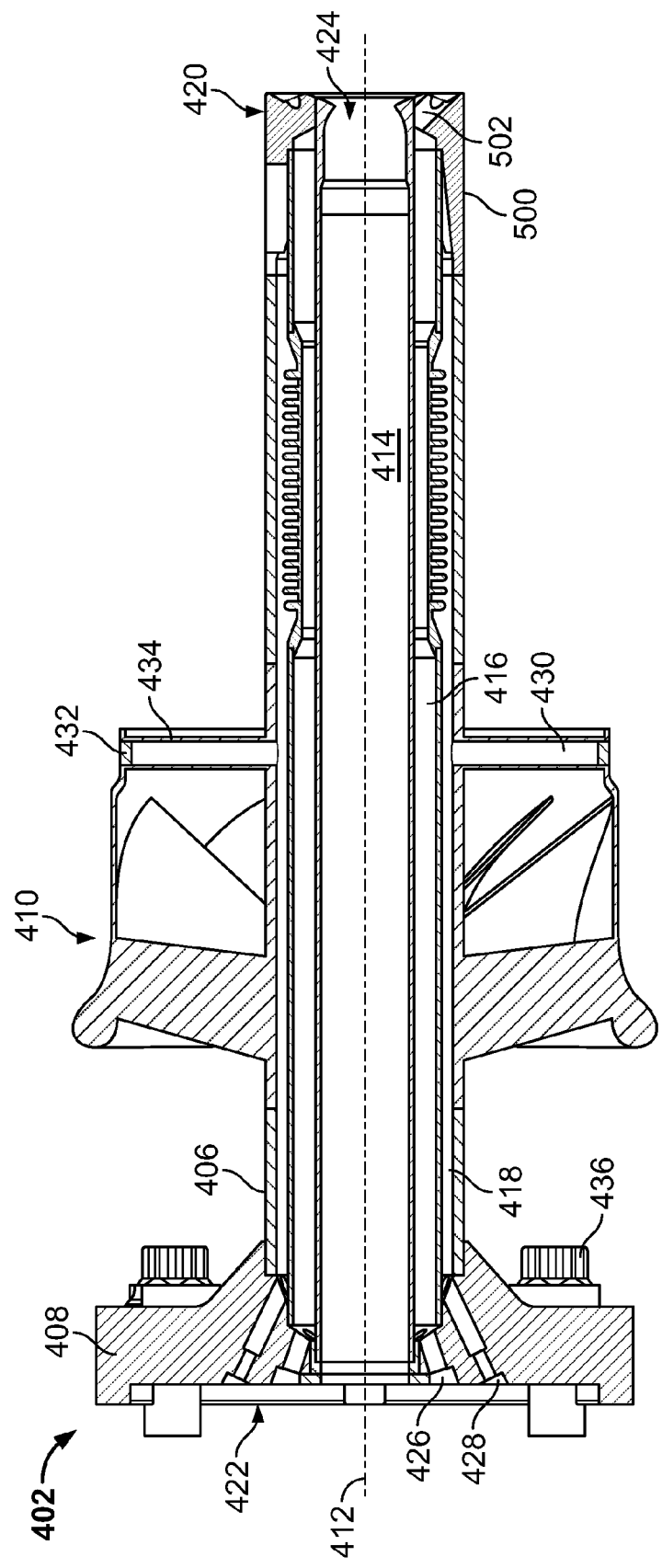
FIG. 4 is a cross-sectional view of an exemplary fuel nozzle assembly that may be used with the combustion system shown in FIG. 1.

FIG. 4 is a cross-sectional view of an exemplary fuel nozzle assembly 400 that may be used with combustor 14. For exemplary purposes, primary fuel nozzle assembly 402 will be described, but it will be understood that tertiary fuel nozzle assembly 404 is essentially similar to primary fuel nozzle assembly 402, except that purge air 224, rather than diffusion fuel 212, is supplied to tertiary fuel nozzle assembly 404. In the exemplary embodiment, tertiary fuel nozzle assembly 404 is configured to inject premix fuel 216 in a manner that is substantially similar to the primary fuel nozzle 402 premix fuel 216 injection configuration.

In the exemplary embodiment, each fuel nozzle assembly 402 includes a body 406, a base 408, and a vane assembly 410. Body 406 extends axially along a nozzle centerline 412. Body 406 is formed with a plurality of passages 414, 416, and 418 that each extend substantially parallel to centerline 412 from a tip end 420 through base 408 to a base end 422. More specifically, in the exemplary embodiment, nozzle assembly 402 includes a center passage 414, a diffusion passage 416, and a premix passage 418.

In the exemplary embodiment, center passage 414 includes an oil/water cartridge (not shown) and is formed with an outlet 424 through a nozzle tip 500, and diffusion passage 416 includes a diffusion nozzle inlet 426. Tertiary fuel nozzle assembly 404 includes a purge air passage (not shown), including a nozzle purge air inlet (not shown) that are each configured substantially similarly to diffusion passage 416 and diffusion nozzle inlet 426, except that the purge air inlet is coupled to purge air circuit 220. Diffusion passage 416 includes a plurality of diffusion outlets 502 that extend through nozzle tip 500, as described in more detail below. Premix passage 418, included in both primary and tertiary fuel nozzle assemblies 402 and 404, includes a premix fuel inlet 428 defined in base 408. Premix passage 418 includes a plurality of radially, outwardly-extending vane passages 430. More specifically, in the exemplary embodiment, vane passages 430 each extend through a vane 432 (shown in FIG. 3) of vane assembly 410. Each vane passage 430 includes a plurality of premix vane openings 434 (also shown in FIG. 3).

In the exemplary embodiment, base 408 is coupled to end cover assembly 42 using, but not limited to using, a plurality of mechanical fasteners 436, for example. Alternatively, base 408 is coupled to end cover assembly 42 using any other suitable fastening mechanism that enables nozzle assembly 402 and/or 404 to function as described herein. In the exemplary embodiment, diffusion passage 416 is coupled in flow communication with primary fuel circuit 200. Further, in the exemplary embodiment, within primary fuel nozzle assemblies 402, premix passage 418 is coupled to secondary fuel circuit 202, and in tertiary fuel nozzle assembly 404, premix passage 418 is coupled to tertiary fuel circuit 204.

Figure 5:
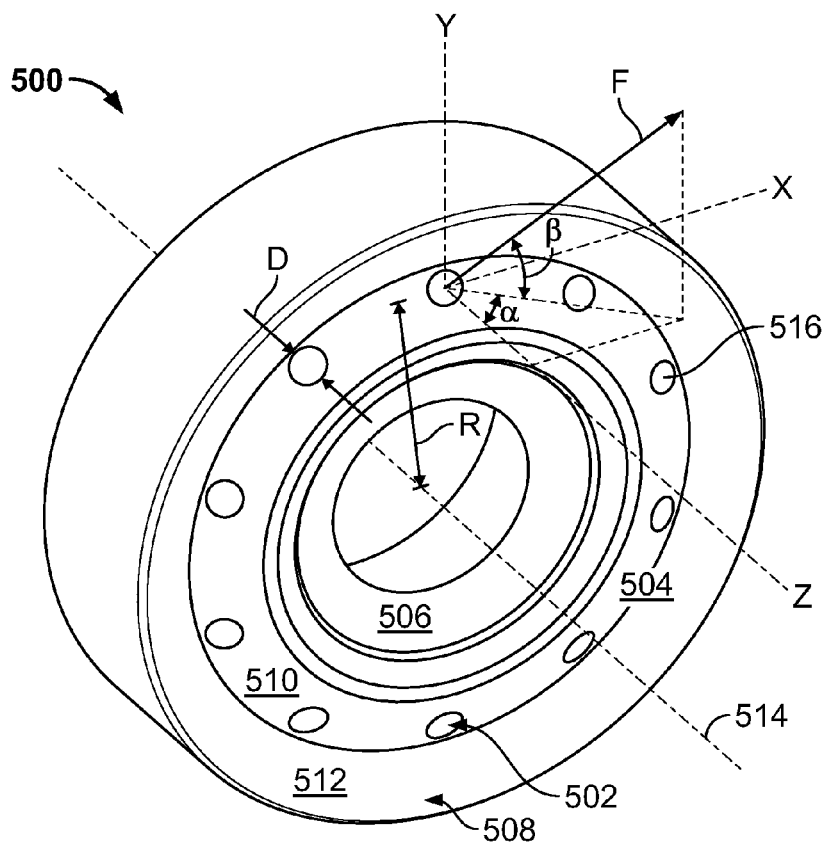
FIG. 5 is a perspective view of an exemplary fuel nozzle tip that may be used with the fuel nozzle shown in FIG. 4.
Figure 6:
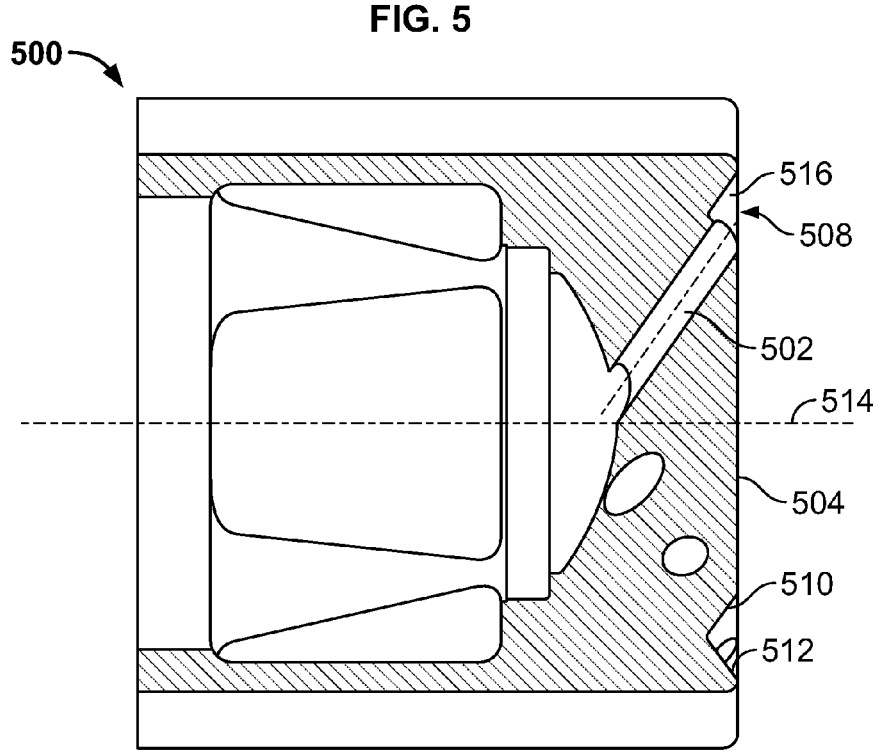
FIG. 6 is a cross-sectional view of the fuel nozzle tip shown in FIG. 5.

FIG. 5 is a perspective view of an exemplary nozzle tip 500 that may be used with fuel nozzle assembly 402 and/or 404 (shown in FIG. 4). FIG. 6 is a cross-sectional view of nozzle tip 500. In FIG. 6, center passage 414 and center outlet 424 have been omitted for clarity.

In the exemplary embodiment, nozzle tip 500 includes center outlet 424 and a plurality of diffusion outlets 502. For exemplary purposes, diffusion outlets 502 are described, but it should be understood that, in tertiary fuel nozzle assembly 404, purge air outlets (not shown) are essentially similar to diffusion outlets 502, except that purge air, rather than diffusion fuel, is supplied through the purge air outlets. In the exemplary embodiment, a forward face 504 of nozzle tip 500 includes a central sloped portion 506 and an annular recessed portion 508. Recessed portion 508 is substantially annular and includes a radially inner wall 510 and a radially outer wall 512 that are oriented with respect to each such that recessed portion 508 has a generally V-shaped cross-sectional profile. In the exemplary embodiment, recessed portion 508 is oriented to avoid the flow of diffusion fuel 212 (shown in FIG. 2) exiting diffusion outlets 502. Alternatively, recessed portion 508 may be oriented to direct the flow of diffusion fuel 212 (shown in FIG. 2) exiting diffusion outlets 502.

In the exemplary embodiment, center outlet 424 extends through nozzle tip 500 generally along an axial centerline 514. Each diffusion outlet 502 includes a forward opening 516 and an aft opening 518, and outlet 502 extends between openings 516 and 518. In the exemplary embodiment, forward openings 516 are each located at a radius R from centerline 514, in a substantially circular array. More specifically, in the exemplary embodiment, forward openings 516 are each defined in radially inner wall 510 and have a diameter D. In the exemplary embodiment, diameter D is larger than 0.110 inches, and more specifically, may be, for example, 0.126 inches.

A respective coordinate system is defined at each forward opening 516. In the exemplary embodiment, an X-axis is aligned tangentially to a circle having a radius R, a Y-axis is aligned perpendicularly to the X-axis in a radial direction, and a Z-axis is substantially aligned with centerline 514. An angle α is measured from the Z-axis in an X-Z plane, and an angle β is measured from the Z-axis in a Y-Z plane. In the exemplary embodiment, each diffusion outlet 502 is oriented along a respective line F that extends from each respective forward opening 516 at angle α and at angle β. As such, diffusion outlets 502 are defined in a helical array in nozzle tip 500. In the exemplary embodiment, angle α is substantially equal to angle β. Alternatively, angle α may be different than angle β. Further, in the exemplary embodiment, both angle α and angle β are greater than approximately 30°. More specifically, in one exemplary embodiment, angle α and angle β are both approximately equal to 45° such that the fuel flow immediately downstream from fuel nozzle assemblies 400 is lean enough to ignite and to sustain combustion.

When combustor 14 is in operation, diffusion fuel 212 is channeled from fuel supply 208 through primary fuel circuit 200 and primary fuel nozzle assemblies 402 into combustion zone 82. More specifically, control system 44 controls the operation of valve $V_1$ to enable diffusion fuel 212 to enter primary fuel circuit 200. Diffusion fuel 212 is discharged from primary fuel circuit 200 into primary nozzle assemblies 402 through diffusion circuit and nozzle inlets 210 and 426. Diffusion fuel 212 is discharged from primary nozzle assemblies 402 through each nozzle tip 500. Diffusion outlets 502 ensure the diffusion fuel 212 is discharged at angles α and β and generally along each line F. As such, diffusion fuel 212 diffuses adjacent each nozzle assembly tip end 420 and remains lean enough to ignite. Diffusion fuel 212 is dispersed within combustion zone 82 and mixes with air 22 entering combustion zone 82 through air passage 74 and/or premix assemblies 88. Spark plugs 78 and cross-fire tubes 80 ignite the fuel-air mixture within combustion zone 82 to create combustion gases 32.

Figure 7:
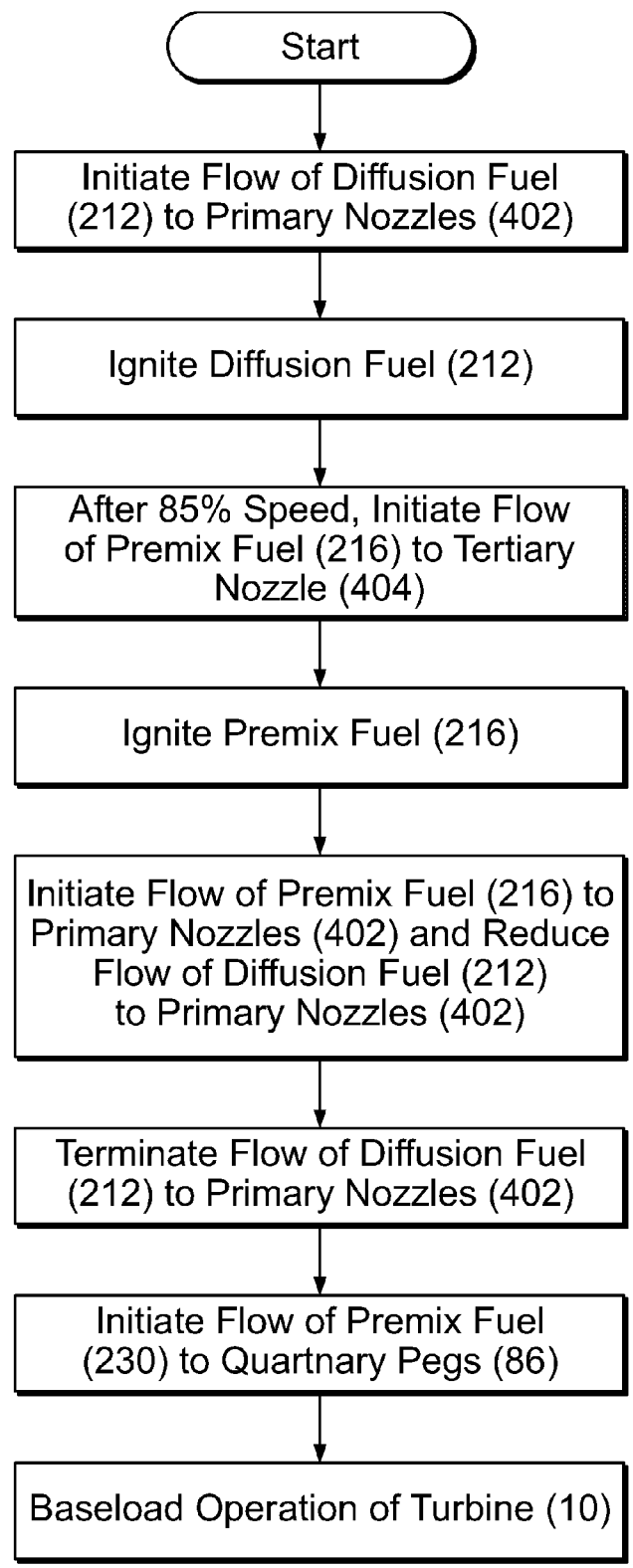
FIG. 7 is a flowchart of an exemplary method of operating the combustion system shown in FIG. 1.
Figure 8:
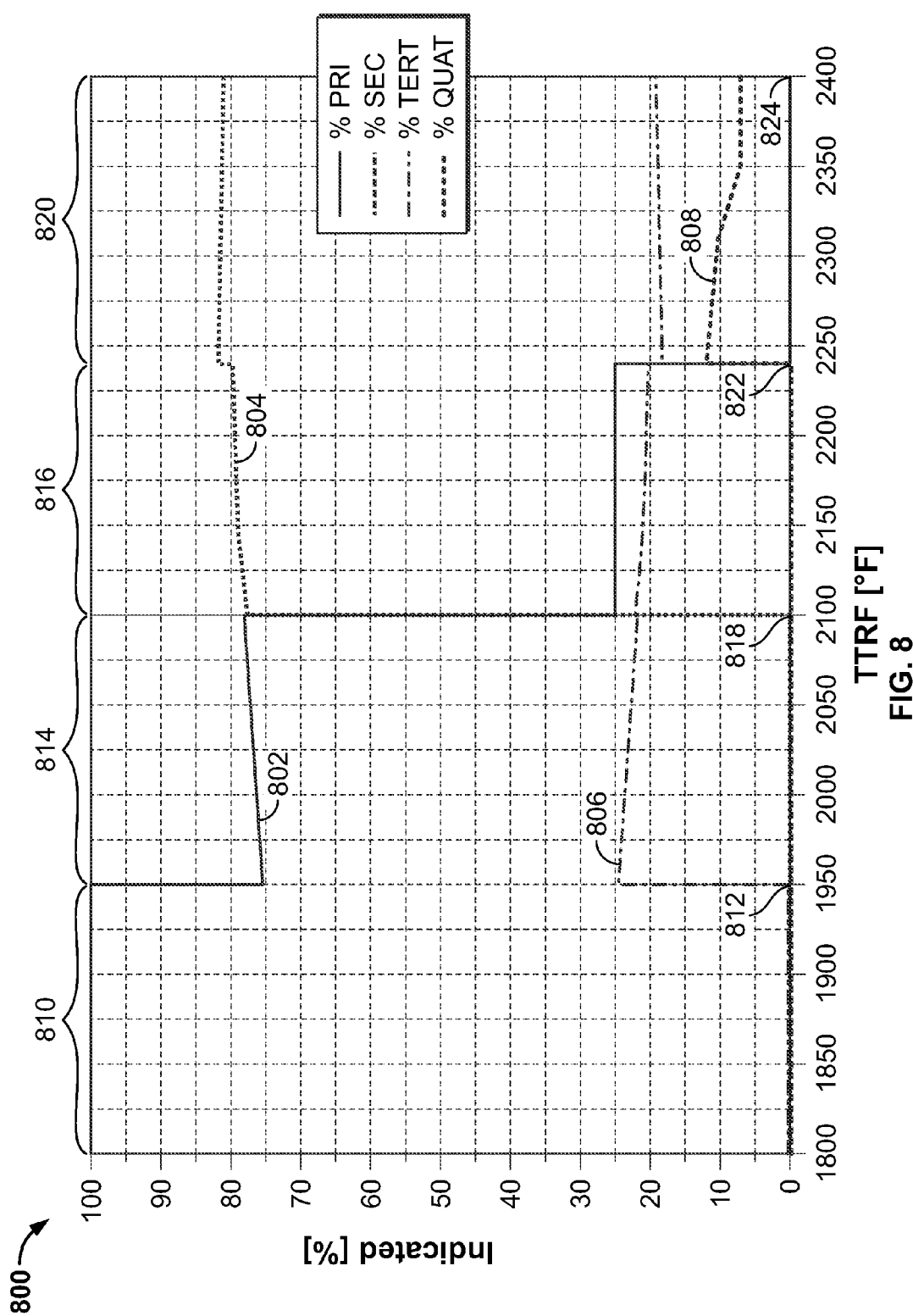
FIG. 8 is a graphical representation illustrating exemplary fuel circuit proportions that may be used when using the method shown in FIG. 7.

FIG. 7 is a flowchart of an exemplary method of operating gas turbine engine that includes primary fuel nozzle assemblies 402 and tertiary fuel nozzle assembly 404, as described above. FIG. 8 is a graphical representation 800 of exemplary fuel circuit proportions, in percentage, with respect to mean firing temperature (TTRF), in degrees Fahrenheit, that may be used when the method illustrated in FIG. 7 is implemented. As used herein, the circuit proportions are represented using the convention P/S/T-Q, wherein P is the approximate percentage of total fuel within zone 82 (shown in FIG. 1) injected through primary fuel circuit 200 (shown in FIG. 2), S is the approximate percentage of total fuel injected through secondary and tertiary fuel circuits 202 and 204 (each shown in FIG. 2) with respect to secondary fuel circuit 202, T is the approximate percentage of total fuel injected through secondary and tertiary fuel circuits 202 and 204 with respect to tertiary fuel circuit 204, and Q is the approximate percentage of total fuel within zone 82 injected through quaternary fuel circuit 206 (shown in FIG. 2). P is represented on graph 800 as line 802, S is represented on graph 800 as line 804, T is represented on graph 800 as line 806, and Q is represented on graph 800 as line 808.

In the exemplary embodiment, to begin operation of engine 10, an air-fuel mixture is ignited within combustor 14. Control system 44 controls a flow of fuel 212, 216, and/or 230 to combustor 14 via fuel circuits 200, 202, 204, and/or 206. The ignition procedure is initiated 700 by introducing a flow of diffusion fuel 212 into combustion zone 82. More specifically, valve $V_1$ is opened to enable diffusion fuel 212 to enter primary fuel circuit 200 and to flow through primary fuel nozzle assemblies 402, prior to being discharged through diffusion outlets 502 into combustion zone 82. In the exemplary embodiment, primary fuel circuit 200 supplies approximately 100% of the fuel entering combustion zone 82 during this stage of engine operation such that the fuel proportion is approximately 100/0/0-0.

Diffusion fuel 212 is ignited 702, by, for example, control system 44 prompting spark plugs 78 and cross-fire tubes 80 to ignite diffusion fuel 212 within combustion zone 82. Once diffusion fuel 212 is ignited 702, combustion gases 32 generated are channeled from combustion zone 82 through transition duct 26 towards turbine 16. When turbine 16 attains a full-speed, no-load (FSNL) operating condition, combustor 14 is at a mean firing temperature (TTRF) of, for example, 1280° F. As such, combustor 14 combusts diffusion fuel 212 from ignition through FSNL to an initial predetermined percentage of baseload without the addition of premix fuel 216 and/or 230 in combustion zone 82. Such an ignition may be referred to as a "diffusion start" mode 810.

After FSNL is reached, engine 10 begins taking on load, and control system 44 alters fuel flow to fuel circuits 200, 202, 204, and/or 206. More specifically, in the exemplary embodiment, prior to engine 10 reaching a first predetermined percentage of baseload at a first transfer point 812, for example, but not limited to, a point at approximately 1950° F. such that turbine is at substantially 30% of baseload, control system 44 is transferred from the diffusion start mode 810 to a lean-lean mode 814. A "lean-lean mode" of operation refers to a mode of turbine operation in which primary nozzle assemblies 402 supply diffusion fuel 212 into combustion zone 82, and tertiary nozzle assembly 404 supplies premix fuel 216 into combustion zone 82.

In the exemplary embodiment, the transition from the diffusion start mode 810 to the lean-lean mode 814 involves continuing a flow of diffusion fuel 212 to primary nozzle assemblies 402 while initiating 704 a flow of premix fuel 216 to tertiary fuel nozzle assembly 404. More specifically, in the exemplary embodiment, control system 44 at least partially opens valve $V_3$ to enable premix fuel 216 to enter tertiary fuel circuit 202. Alternatively, the flow of premix fuel 216 may be initiated in any other suitable manner that enables combustor 14 to function as described herein. Once discharged from fuel nozzle assemblies 402 and 404, premix fuel 216 is ignited 706 by, for example, the flame generated by combusting diffusion fuel 212. In the exemplary embodiment, during lean-lean mode 814 at a TTRF of approximately 2025° F., the fuel proportion is approximately 77/0/23-0.

As the load of engine 10 increases, the amount of premix fuel 216 supplied to combustion zone 82 increases. More specifically, control system 44 transitions combustor 14 from the lean-lean mode 814 to a piloted premix mode (PPM) 816 of operation at a second predetermined percentage of the baseload at a second transfer point 818. For example, in one embodiment, control system 44 transitions combustor 14 from the lean-lean mode 814 to PPM 816 when transfer point 818 is a point at approximately 2100° F.

"Piloted premix mode" refers to an operating mode in which primary nozzle assemblies 402 and tertiary nozzle assembly 404 discharge premix fuel 216 into combustion zone 82, while a reduced amount of diffusion fuel 212 is discharged by primary nozzle assemblies 402. Premix operation facilitates reducing the amount of pollutants, such as, for example, nitrogen oxides (NOx) and/or carbon dioxide (CO), released from fuel 212 and/or 216 during combustion by staging the air entering combustion zone 82. In the exemplary embodiment, an increased amount of air within combustion zone 82 facilitates decreasing the flame temperature, or reaction temperature, which reduces thermal NOx formation within combustor 14. More specifically, air, for example, air 22 from passage 74, is initially mixed with the fuel within secondary fuel circuit 202, tertiary fuel circuit 204, and/or quaternary fuel circuit 206 to create premix fuel 216 and/or 230. Air 22 from air passage 74 is then mixed with premix fuel 216 in combustion zone 82. Premixing the air and fuel before the mixture is discharged into combustion zone 82 facilitates minimizing localized fuel-rich pockets and high temperatures within zone 82.

In the exemplary embodiment, the transition from the lean-lean mode 814 to the piloted premix mode 816 involves initiating 708 a flow of premix fuel 216 to primary fuel nozzle assemblies 402, while reducing 708 a flow of diffusion fuel 212 to primary fuel nozzle assemblies 402. Such a transition generally occurs when engine 10 is operating at a second predetermined percentage of the base load, which is greater than the first predetermined percentage of the baseload. More specifically, in the exemplary embodiment, control system 44 partially closes valve $V_1$ and at least partially opens valve $V_2$ to enable premix fuel 216 to enter secondary fuel circuit 202. Alternatively, the flow of diffusion fuel 212 may be reduced 708 and the flow of premix fuel 216 may be initiated 708 in any other suitable way that enables combustor 14 to function as described herein. Premix fuel 216 from primary fuel nozzle assemblies 402 ignites, in the exemplary embodiment, from the flame generated during combustion of diffusion fuel 212 and/or tertiary premix fuel 216. In the exemplary embodiment, at, for example a TTRF of approximately 2165° F., fuel 212 and 216 is injected through circuits 200, 202, and 204 at a proportion of approximately 25/79/21-0.

As the load of engine 10 is increased, the amount of premix fuel 216 supplied to combustion zone 82 increases and the amount of diffusion fuel 212 supplied to combustion zone 82 decreases. More specifically, control system 44 transitions combustor 14 from the piloted premix mode 816 of operation to a premix steady state (PMSS) mode 820 of operation when engine 10 is at a third predetermined percentage of the baseload at a third transfer point 822. For example, in one embodiment, control system 44 transitions to PMSS 820 when engine 10 is operating at a percentage of the baseload corresponding to transfer point 822 at a TTRF of approximately 2240° F.

"Premix steady state mode" refers to an operating mode in which primary nozzle assemblies 402 and tertiary nozzle assembly 404 discharge premix fuel 216 into combustion zone 82, while diffusion fuel 212 discharged by primary nozzle assemblies 402 is terminated. The premix steady state mode 820 is substantially similar to the premix operation described above, except that premix steady state 820 facilitates an additional reduction of an amount of pollutants, for example, NOx and/or CO, released from fuel 212 and/or 216 during combustion by substantially eliminating combustion of diffusion fuel 212.

In the exemplary embodiment, the transition from the piloted premix mode 816 to the premix steady state mode 820 involves terminating 710 the flow of diffusion fuel 212 to primary fuel nozzle assemblies 402, while increasing a flow of premix fuel 216 to primary fuel nozzle assemblies 402 when engine 10 reaches the third predetermined percentage of the baseload. In the exemplary embodiment, a flow of premix fuel 230 to quaternary pegs 86 through quaternary fuel circuit 206 is initiated 712. The use of premix fuel 230 reduces combustion dynamics that may occur in combustor 14, such as, for example, low combustion acoustic noise and/or dynamic pressure fluctuations. In an alternative embodiment, premix fuel 230 is supplied other than as described herein. In the exemplary embodiment, control system 44 substantially closes valve $V_1$, opens valve $V_2$ to enable premix fuel 216 to enter secondary fuel circuit 202, and opens valve $V_4$ to enable premix fuel 230 to enter quaternary fuel circuit 206. Alternatively, the flow of diffusion fuel 212 may be terminated and the flow of premix fuel 230 may be initiated in any other suitable way that enables combustor 14 to function as described herein. In the exemplary embodiment, at turbine conditions of, for example, a TTRF approximately equal to 2240° F. such that turbine load is about 50% of the baseload, the fuel proportion is approximately 0/85/18-13. At such a turbine condition, a turndown point may occur.

When engine 10 is operating 714 substantially at its baseload, engine 10 is operating, in the exemplary embodiment, in the premix steady state mode 820. More specifically, in the exemplary embodiment, at baseload, engine 10 is at a turbine condition where a reference point 824 is at, for example, a TTRF equal to approximately 2400° F., the fuel proportion is approximately 0/82/19-8.

The above-described methods and apparatus facilitate combusting fuel in a gas turbine engine such that a maximum liner wall temperature is facilitated to be reduced and such that a flame stability is facilitated to be increased by improving the fuel-to-air ratio of the diffusion fuel downstream from the fuel nozzles. The ratio of fuel to air downstream from the fuel nozzles remains below a rich blow out boundary by injecting the diffusion fuel into the combustion chamber at an injection angle that facilitates mixing the diffusion fuel with air within the combustion chamber. Such injection of the diffusion fuel facilitates eliminating the injection of premix fuel before the turbine reaches full-speed, no-load operation. As such, a lean-lean start is facilitated to be avoided by injecting the diffusion fuel as described herein. By avoiding a lean-lean start, the non-uniformity in liner wall temperature is facilitated to be reduced, which facilitates decreasing an amount of wear on surrounding hardware. Further, the lean-lean mode described herein involves injecting a lower percentage of premix fuel through a single nozzle, about 25% of total fuel in the combustor, as compared to systems injecting about 50% of total fuel in the combustor through a single nozzle. As such, a localized liner temperature proximate the nozzle injecting premix fuel is facilitated to be reduced.

Moreover, the diffusion fuel injection angle described herein facilitates forming a more stable and well-anchored flame as compared to the generally small, unstable diffusion flames that occur during known lean-lean starts. The more stable and well-anchored flame facilitates reducing the possibility of a blow out, and, more specifically, a rich blow out. The diffusion fuel injection angle described herein facilitates creating a more uniform temperature within the combustion chamber, which facilitates reducing wear on the surrounding hardware. Moreover, the diameter of the tip openings, as described herein, facilitates reducing clogging of the nozzle and facilitates increasing fuel-air mixing downstream of the fuel nozzles.

The above-described method and apparatus further facilitates staging fuel and/or air injection which facilitates reducing the emission of pollutants from combusting the fuel. More specifically, the fuel and/or air staging facilitates: reducing NOx and/or CO emissions as measured at an exhaust plane of the gas turbine; increasing flame stability in by using a diffusion operating mode; maintaining fuel/air ratios between a lean-blow-out margin and a rich-blow-out margin over a broad range of gas turbine load settings; and/or decreasing combustion dynamics.

Exemplary embodiments of a method and apparatus for combusting a fuel in a gas turbine engine are described above in detail. The method and apparatus are not limited to the specific embodiments described herein, but rather, components of the method and apparatus may be utilized independently and separately from other components described herein. For example, the fuel nozzle tip may also be used in combination with other combustion systems and methods, and is not limited to practice with only the gas turbine engine as described herein. Further, the method for operating the gas turbine engine may also be used in combination with other combustion systems and methods, and is not limited to practice with only the combustor as described herein Rather, the present invention can be implemented and utilized in connection with many other fuel combustion applications.

While the invention has been described in terms of various specific embodiments, those skilled in the art will recognize that the invention can be practiced with modification within the spirit and scope of the claims.

What is claimed is:

1. A system for use with a gas turbine engine, said system comprising:
    a combustor assembly;
    a plurality of first nozzles coupled to said combustor assembly, wherein each of said plurality of first nozzles comprises a nozzle tip comprising a plurality of outlet passageways coupled to a first fuel source, and wherein each of said plurality of first nozzles comprises a plurality of first vane passageways coupled to a second fuel source;
    a second nozzle coupled to said combustor assembly, said second nozzle includes a plurality of second vane passageways coupled to said second fuel source; and
    a control system coupled to said combustor assembly, said control system configured to:
        channel a first fuel from said first fuel source through said plurality of outlet passageways of said plurality of first nozzles;
        operate said combustor assembly at a first predetermined percentage of a baseload by channeling the first fuel only through said plurality of first nozzles;
        channel a second fuel from said second fuel source through said plurality of second vane passageways of said second nozzle when the gas turbine engine attains the first predetermined percentage of a baseload;
        channel said second fuel from said second fuel source through said plurality of first vane passageways of said plurality of first nozzles when the gas turbine engine is operated at a second predetermined percentage of the baseload, wherein the second predetermined percentage of the baseload being greater than the first predetermined percentage of the baseload; and
        reduce a flow of said first fuel entering said plurality of first nozzles when the gas turbine engine is operated at a load of greater than the second predetermined percentage of the baseload.

2. A system in accordance with claim 1 further comprising a plurality of third nozzles extending radially inward from a combustor assembly casing, said plurality of third nozzles coupled to a third fuel source.

3. A system in accordance with claim 2 wherein said control system is further configured to channel a third fuel to said plurality of third nozzles when the gas turbine engine is operated at a load greater than a second predetermined percentage of the baseload.

4. A system in accordance with claim 1 wherein each said outlet passageway comprises respective X-, Y-, and Z-axes defined with respect to a tangent line, a nozzle tip radius, and a nozzle centerline, each of said plurality of outlet passageways being oriented at a discharge angle of between about 30° and about 45° measured with respect to said respective Z-axis in a respective X-Z plane.

5. A system in accordance with claim 1 wherein said control system is further configured to terminate a flow of said first fuel to said plurality of first nozzles when the gas turbine engine is operated at a load greater than the second predetermined percentage of the baseload.

6. A combustor for use with a gas turbine engine, said combustor comprising:
   a plurality of nozzles, wherein each of said plurality of nozzles comprises a nozzle tip defining a plurality of outlet passageways coupled to a first fuel source, and wherein each of said plurality of nozzles further defines a plurality of first vane passageways coupled to a second fuel source wherein each of said plurality of nozzles comprises:
      a body defining a centerline;
      a first passageway extending through said body along said centerline;
      a second passageway extending through said body, said second passageway substantially circumscribes at least a portion of said first passageway; and
      a nozzle tip coupled to a downstream end of said first passageway and to said second passageway, said nozzle tip having a radius extending from a center of said nozzle tip to an outer surface of said nozzle tip, said nozzle tip comprising:
         a downstream face;
         a first outlet passageway extending through said downstream face, said first outlet passageway in flow communication with said first passageway; and
         a plurality of second outlet passageways that each comprise an opening defined in said downstream face, each of said plurality of second outlet passageways in flow communication with said second passageway, wherein each opening comprises respective X-, Y-, and Z-axes defined with respect to a tangent line, said radius, and said centerline, each of said plurality of outlet passageways is at discharge angle between about 30° and about 45° measured with respect to the respective Z-axis in a respective X-Z plane.

7. A combustor in accordance with claim 6 further comprising a third passageway extending through said body, said third passageway substantially circumscribes at least a portion of said first passageway and said second passageway.

8. A combustor in accordance with claim 7 further comprising a plurality of vanes extending radially outward from said body, each of said plurality of vanes comprises:
   a vane passageway in flow communication with said third passageway; and
   a plurality of apertures extending from each said vane passageway through a respective vane.

9. A combustor in accordance with claim 6 wherein each said second outlet passageway opening defines a diameter larger than substantially 0.110 inches.

10. A combustor in accordance with claim 9 wherein each said second outlet passageway opening defines a diameter substantially equal to 0.126 inches.

11. A combustor in accordance with claim 6 wherein said first passageway comprises a fluid therein, said fluid comprises at least one of a liquid fuel, a gaseous fuel, and a solid fuel.

* * * * *